United States Patent
Xie

(10) Patent No.: US 10,082,719 B2
(45) Date of Patent: Sep. 25, 2018

(54) LIQUID CRYSTAL LENS AND 3D DISPLAY

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 221 days.

(21) Appl. No.: 15/125,179

(22) PCT Filed: Jul. 12, 2016

(86) PCT No.: PCT/CN2016/089780
§ 371 (c)(1),
(2) Date: Sep. 11, 2016

(87) PCT Pub. No.: WO2017/219404
PCT Pub. Date: Dec. 28, 2017

(65) Prior Publication Data
US 2018/0217470 A1   Aug. 2, 2018

(30) Foreign Application Priority Data
Jun. 22, 2016   (CN) .......................... 2016 1 0458682

(51) Int. Cl.
*G02F 1/1339* (2006.01)
*G02F 1/29* (2006.01)
*G02B 27/22* (2018.01)

(52) U.S. Cl.
CPC ........... *G02F 1/29* (2013.01); *G02B 27/2214* (2013.01); *G02F 2201/38* (2013.01)

(58) Field of Classification Search
CPC .... G02F 1/29; G02F 2201/38; G02B 27/2214
USPC .................................................. 349/155–157
See application file for complete search history.

(56) References Cited

U.S. PATENT DOCUMENTS 5,130,831 A * 7/1992 Kohara ............... G02F 1/13392
349/153

* cited by examiner

*Primary Examiner* — Charles Chang
(74) *Attorney, Agent, or Firm* — Andrew C. Cheng

(57) ABSTRACT

The disclosure provides a liquid crystal lens, including an upper substrate, a lower substrate, a liquid crystal layer and a spacer, the liquid crystal layer and the spacer are disposed between the upper substrate and the lower substrate. A surface of the spacer is coated with a first antireflection film and a second antireflection film in turn. An index of refraction of the liquid crystal layer is $n_0$. An index of refraction of the first antireflection film is $n_2$, a thickness of which is d2. An index of refraction of the second antireflection film is $n_1$, a thickness of the second antireflection film is d1. An index of refraction of the spacer is $n_3$, and $$n_1 = n_0^{\frac{2}{3}} n_3^{\frac{1}{3}}, \; n_2 = n_0^{\frac{1}{3}} n_3^{\frac{2}{3}},$$

$n_1 d1 = n_2 d2 = \lambda/6$, where $\lambda$ is a wavelength of light. The liquid crystal lens and the 3D display can reduce light intensity of the reflective rays on the spacer and increase contrast of the image.

10 Claims, 2 Drawing Sheets

LIQUID CRYSTAL LENS AND 3D DISPLAY

CROSS REFERENCE TO RELATED APPLICATION

This disclosure claims priority to Chinese patent application No. 201610458682.X, entitled "LIQUID CRYSTAL LENS AND 3D DISPLAY" filed on Jun. 22, 2016, which is incorporated by reference in its entirety.

FIELD OF THE DISCLOSURE

The disclosure relates to a three dimensional display technical field, and more particularly to a liquid crystal lens and a 3D display with the liquid crystal lens.

BACKGROUND OF THE DISCLOSURE

A glasses-free 3D display technique can achieve an effect of showing a 3D image without glasses during reading words and watching images, which is close to habits of users, so that the glasses-free 3D display technique has become the trend.

A liquid crystal lens is applied in the glasses-free 3D display technical field, whose advantages can be simple to control, extremely reliable and low in driving voltage, with enormous potential in applications. But in a practical design process, a large spacer applied to support a liquid crystal case is necessary to be adopted due to a thick liquid crystal layer of the liquid crystal lens. A spherical spacer can affect light-emitting directions of rays emitted from a display panel in order to distinguish light intensity distributions in various directions, which can lead to contrast of display effects to be reduced and colors to be dimmed, influence grows with expanding volume. Especially in the darkness, when brilliant rays from outside are reflected, the spacer can form an apparent light spot on the reflected light, which illuminates the dark spot and decreases contrast, so as to affect the entire 3D display effect.

SUMMARY OF THE DISCLOSURE

An objective of the disclosure is to provide a liquid crystal lens that can improve contrast of an image and effects of 3D display.

Another objective of the disclosure is to provide a 3D display adopting the liquid crystal lens above.

To achieve the previous objectives, embodiments of the disclosure are as follows.

The disclosure provides a liquid crystal lens. The liquid crystal lens includes an upper substrate, a lower substrate, a liquid crystal layer and a spacer, the liquid crystal layer and the spacer are disposed between the upper substrate and the lower substrate. A surface of the spacer is coated with a first antireflection film and a second antireflection film in turn. An index of refraction of the liquid crystal layer is $n_0$. An index of refraction of the first antireflection film is $n_2$, a thickness of the first antireflection film is d2. An index of refraction of the second antireflection film is $n_1$, a thickness of the second antireflection film is d1. An index of refraction of the spacer is $n_3$, and $$n_1 = n_0^{\frac{2}{3}} n_3^{\frac{1}{3}}, n_2 = n_0^{\frac{1}{3}} n_3^{\frac{2}{3}},$$

$n_1 d1 = n_2 d2 = \lambda/6$, where $\lambda$ is a wavelength of light.

The index of refraction $n_2$ of the first antireflection film is larger than the index of refraction $n_1$ of the second antireflection film.

The spacer is spherical.

A diameter of the spacer is 20 um~50 um.

Reflectivity of the first antireflection film and that of the second antireflection film are directly proportional to a size of the spacer.

Reflectivity of the first antireflection film and that of the second antireflection film are 10%-40%.

The first antireflection film and the second antireflection film can be made by one or more materials selected from a group consisting of $SiO_2$, $SiN_4$, $MgF_2$, $TiO_2$, $ZrO_2$, $Nb_2O_5$. Material of the first antireflection film and that of the second antireflection film are different.

The disclosure provides a 3D display, including a liquid crystal lens. The liquid crystal lens includes an upper substrate, a lower substrate, a liquid crystal layer and a spacer, the liquid crystal layer and the spacer are disposed between the upper substrate and the lower substrate. A surface of the spacer is coated with a first antireflection film and a second antireflection film in turn. An index of refraction of the liquid crystal layer is $n_0$. An index of refraction of the first antireflection film is $n_2$, a thickness of the first antireflection film is d2. An index of refraction of the second antireflection film is $n_1$, a thickness of the second antireflection film is d1. An index of refraction of the spacer is $n_3$, and $$n_1 = n_0^{\frac{2}{3}} n_3^{\frac{1}{3}}, n_2 = n_0^{\frac{1}{3}} n_3^{\frac{2}{3}},$$

$n_1 d1 = n_2 d2 = \lambda/6$, where $\lambda$ is a wavelength of light.

The spacer is spherical.

The index of refraction $n_2$ of the first antireflection film is larger than the index of refraction $n_1$ of the second antireflection film.

The embodiments of the disclosure have following advantages or beneficial effects.

According to the disclosure, two layers of antireflection films are disposed on the spacer to counteract rays emitted on the spacer by the action of the two layers of antireflection films, so as to reduce light intensity of the reflective rays on the spacer and increase contrast of the image, as well as improving the display effect.

BRIEF DESCRIPTION OF THE DRAWINGS

In order to more clearly illustrate embodiments of the disclosure or prior art, following figures described in embodiments or prior art will be briefly introduced, it is obvious that the drawings are merely some embodiments of the disclosure, a person skilled in the art can obtain other figures according to these figures without creativity.

DETAILED DESCRIPTION OF PREFERRED EMBODIMENTS

Embodiments of the disclosure are described in detail with reference to the accompanying drawings as follows, obviously, the described embodiments are part of embodiments of the disclosure rather than all of them. Based on the embodiments of the disclosure, all other embodiments obtained by a person skilled in the art without creativity should be considered within the scope of protection of the disclosure.

Figure 1:
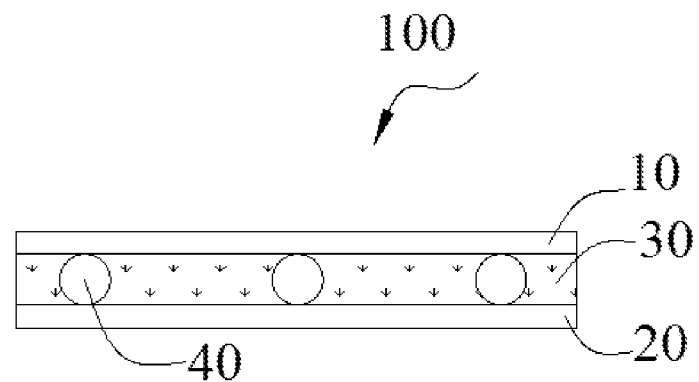
FIG. 1 is a schematic structural view of a liquid crystal lens according to the disclosure.
Figure 2:
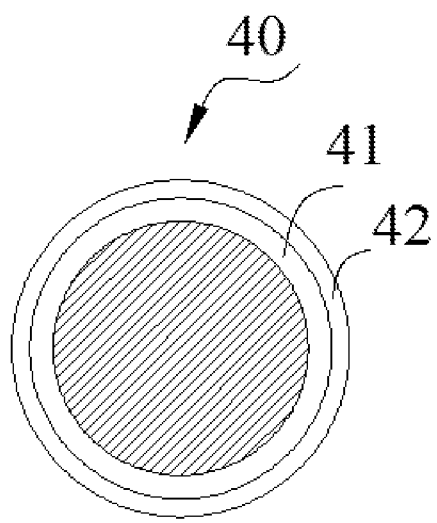
FIG. 2 is an enlarged schematic view of a spacer shown in FIG. 1.

Referring to FIG. 1 and FIG. 2, a liquid crystal lens 100 provided by the disclosure includes an upper substrate 10, a lower substrate 20, a liquid crystal layer 30 disposed between the upper substrate 10 and the lower substrate 20. Spacers 40 are distributed in the liquid crystal layer 30, the spacers 40 support a space between the upper substrate 10 and the lower substrate 20. An external surface of each of the spacers 40 is coated with a first antireflection film 41 and a second antireflection film 42 in turn. Equally, the first antireflection film 41 is between the spacers 40 and the second antireflection film 42. An index of refraction of the liquid crystal layer 30 is $n_0$. An index of refraction of the first antireflection film is $n_2$, a thickness of the first antireflection film is d2. An index of refraction of the second antireflection film is $n_1$, a thickness of the second antireflection film is d1. An index of refraction of the spacers 40 is $n_3$, and $$n_1 = n_0^{\frac{2}{3}} n_3^{\frac{1}{3}}, n_2 = n_0^{\frac{1}{3}} n_3^{\frac{2}{3}},$$

$n_1 d1 = n_2 d2 = \lambda/6$, where $\lambda$ is a wavelength of light.

Figure 3:
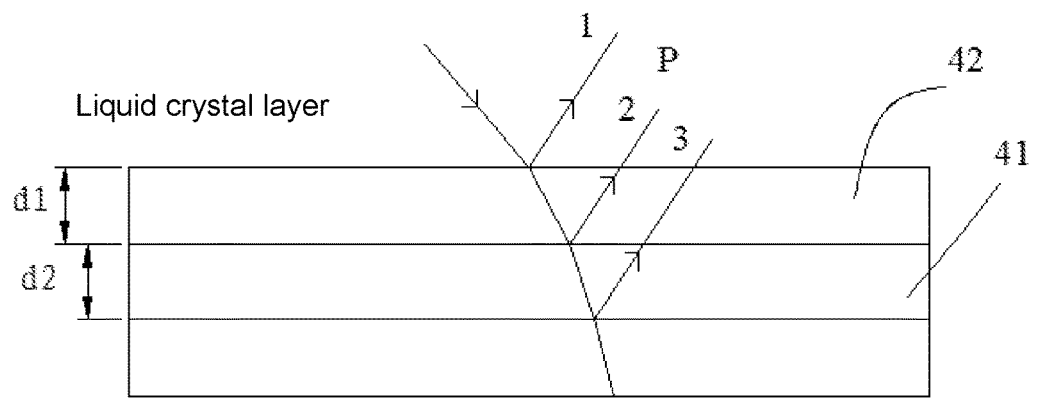
FIG. 3 is a schematic view of an optical path on the spacer shown in FIG. 2.

Referring to FIG. 3 as well, two layers of antireflection films should be coated on the spacers 40 in the disclosure. An optical oscillation equation of incident light striking on a medium is:

$$E_0 = A_0 \cos(\omega t + \theta_0).$$

Where $A_0$ is amplitude, $\omega$ is angular velocity of light, t is time, $\theta_0$ is original phase.

Optical path differences caused by the two layers of thin films are supposed to be $\delta_1$ and $\delta_2$, wave equations of reflective rays 1, 2, 3 are respectively:

$$E_1 = A_1 \cos(\omega t + \theta_0 + \pi)$$
$$E_2 = A_2 \cos\left(\omega t + \theta_0 + \frac{2\pi}{\lambda}\delta_1 + \pi\right)$$
$$E_3 = A_3 \cos\left(\omega t + \theta_0 + \frac{2\pi}{\lambda}\delta_1 + \frac{2\pi}{\lambda}\delta_2 + \pi\right)$$

And light intensity on an interference point P is overlapped by three beams of rays $$E_p = -A_1 \cos(\omega t + \theta_0) - A_2 \cos\left(\omega t + \theta_0 + \frac{2\pi}{\lambda}\delta_1\right) - A_3 \cos\left[\omega t + \theta_0 + \frac{2\pi}{\lambda}(\delta_1 + \delta_2)\right]$$

The equation can obtain following results.

When reflectivity R of the first antireflection film 41, the second antireflection film 42 and the spacers 40 is the same, $$R = \frac{n_1 n_0}{n_1 + n_0} = \frac{n_2 n_1}{n_2 + n_1} = \frac{n_3 n_2}{n_3 + n_2}$$

obtaining results:

$$n_1 = n_0^{\frac{2}{3}} n_3^{\frac{1}{3}}, n_2 = n_0^{\frac{1}{3}} n_3^{\frac{2}{3}}$$

In order to counteract the three beams of reflective light at the point P, transmitted light intensity at P is supposed to be $I_0$, thereby $$I_p = I_0 R \left\{ \cos(\omega t + \theta_0) + \cos\left(\omega t + \theta_0 + \frac{2\pi}{\lambda}\delta_1\right) + \cos\left[\omega t + \theta_0 + \frac{2\pi}{\lambda}(\delta_1 + \delta_2)\right] \right\}^2$$

When $$\frac{2\pi}{\lambda}\delta_1 = \frac{2\pi}{3}; \frac{2\pi}{\lambda}(\delta_1 + \delta_2) = \frac{4\pi}{3},$$

$I_p=0$. And due to $\delta_1=2n_1 d1$ and $\delta_2=2n_2 d2$, so that $n_1 d1=\lambda/6$, $n_2 d2=\lambda/6$, which mean when selected index of refraction of the first antireflection film 41 and index of refraction of the second antireflection film 42 satisfy:

$$n_1 = n_0^{\frac{2}{3}} n_3^{\frac{1}{3}}, n_2 = n_0^{\frac{1}{3}} n_3^{\frac{2}{3}};$$

and thicknesses are both $\lambda/6$, reflective light at the point P is interfered and counteracted, intensity of reflective light is the minimum at the moment, and a technical effect that reduces intensity of reflective light of the spacers 40 can be achieved.

According to the disclosure, two layers of antireflection films are disposed on the spacer to counteract rays emitted on the spacer by the action of the two layers of antireflection films, so as to reduce light intensity of the reflective rays on the spacer and increase contrast of the image, as well as improving the display effect.

In the embodiment of the disclosure, the spacers 40 can adopt photospacers (PS) or ballspacers (BS). According to a thick case of the liquid crystal lens 100 in the disclosure, the spacers 40 are preferably spherical. A diameter of the spacers 40 can be within 20 um~50 um. Identically, an approximate range of the thickness of the case of the liquid crystal lens 100 is within 20 um~50 um. In other embodiments of the disclosure, the spacers can be stripes or others.

Moreover, the reflectivity of the first antireflection film 41 and that of the second antireflection film 42 are determined by sizes of the spacers 40 in the liquid crystal lens 100. When the spacers 40 are relatively large, the reflectivity of the first antireflection film 41 and that of the second antireflection film 42 are high; when the spacers 40 are relatively small, the reflectivity of the first antireflection film 41 and that of the second antireflection film 42 are low. In other words, the reflectivity of the first antireflection film and that of the second antireflection film are directly proportional to the diameter of the spacers. In general, the reflectivity of the first antireflection film 41 and that of the second antireflection film 42 are restricted within 10%-40%.

In a specific embodiment of the disclosure, the first antireflection film 41 and that of the second antireflection film 42 can be coated on the surface of the spacer 40 by a sputtering method or vacuum deposition coating. Generally, the first antireflection film 41 with larger index of refraction is firstly coated on the surface of the spacer 40, then the second antireflection film 42 with smaller index of refraction will be coated to cover the first antireflection film 41. Or, the index of refraction $n_2$ of the first antireflection film is larger than the index of refraction $n_1$ of the second antireflection film. Specifically, the first antireflection film 41 and the second antireflection film 42 can be made by one or more materials selected from a group consisting of $SiO_2$, $SiN_4$, $MgF_2$, $TiO_2$, $ZrO_2$, $Nb_2O_5$. Material of the first antireflection film 41 and that of the second antireflection film 42 are different.

Figure 4:
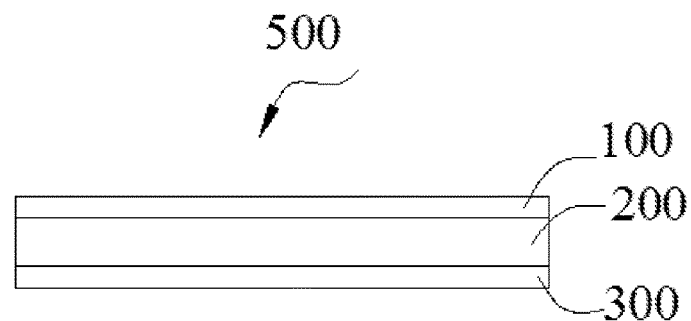
FIG. 4 is a schematic structural view of a 3D display with a structure of the liquid crystal lens shown in FIG. 1.

Referring to FIG. 4, the disclosure further provides a 3D display 500, including the liquid crystal lens 100, a liquid crystal display panel 200 and a backlight source 300 overlapped in turn. The liquid crystal lens 100 is any of the liquid crystal lenses described above.

It is comprehensible that the 3D display 500 provided by the disclosure can be applied in electric paper, a liquid crystal television, a mobile phone, a digital frame, a tablet or any product or component with a display function.

In description of the disclosure, reference terms such as "an embodiment", "embodiments", "example", "specific example" or "examples" indicate specific features, structures, materials or characteristics to be included in at least one embodiment or example of the disclosure. In the disclosure, the terms above are unnecessary to be regarded as the same embodiment or example. Moreover, described features, structures, materials or characteristics can be combined in any one or more of embodiments or examples in a proper manner.

Above are embodiments of the disclosure, which do not limit the scope of the disclosure, any modifications, equivalent replacements or improvements within the spirit and principles of the embodiments described above should be covered by the protected scope of the disclosure.

What is claimed is:

1. A liquid crystal lens, comprising: an upper substrate, a lower substrate, a liquid crystal layer and a spacer, the liquid crystal layer and the spacer disposed between the upper substrate and the lower substrate, wherein a surface of the spacer is coated with a first antireflection film and a second antireflection film in turn, an index of refraction of the liquid crystal layer is $n_0$, an index of refraction of the first antireflection film is $n_2$, a thickness of the first antireflection film is d2, an index of refraction of the second antireflection film is $n_1$, a thickness of the second antireflection film is d1, an index of refraction of the spacer is $n_3$, and $$n_1 = n_0^{\frac{2}{3}} n_3^{\frac{1}{3}}, n_2 = n_0^{\frac{1}{3}} n_3^{\frac{2}{3}},$$
$$n_1 d1 = n_2 d2 = \lambda/6,$$

where $\lambda$ is a wavelength of light.

2. The liquid crystal lens according to claim 1, wherein the index of refraction $n_2$ of the first antireflection film is larger than the index of refraction $n_1$ of the second antireflection film.

3. The liquid crystal lens according to claim 1, wherein the spacer is spherical.

4. The liquid crystal lens according to claim 3, wherein a diameter of the spacer is 20 um~50 um.

5. The liquid crystal lens according to claim 1, wherein reflectivity of the first antireflection film and that of the second antireflection film are directly proportional to a size of the spacer.

6. The liquid crystal lens according to claim 1, wherein reflectivity of the first antireflection film and that of the second antireflection film are 10%-40%.

7. The liquid crystal lens according to claim 1, wherein the first antireflection film and the second antireflection film are made by one or more materials selected from a group consisting of $SiO_2$, $SiN_4$, $MgF_2$, $TiO_2$, $ZrO_2$, $Nb_2O_5$, material of the first antireflection film and that of the second antireflection film are different.

8. A 3D display, comprising a liquid crystal lens, the liquid crystal lens comprising: an upper substrate, a lower substrate, a liquid crystal layer and a spacer, the liquid crystal layer and the spacer disposed between the upper substrate and the lower substrate, wherein a surface of the spacer is coated with a first antireflection film and a second antireflection film in turn, an index of refraction of the liquid crystal layer is $n_0$, an index of refraction of the first antireflection film is $n_2$, a thickness of the first antireflection film is d2, an index of refraction of the second antireflection film is $n_1$, a thickness of the second antireflection film is d1, an index of refraction of the spacer is $n_3$, $$n_1 = n_0^{\frac{2}{3}} n_3^{\frac{1}{3}}, n_2 = n_0^{\frac{1}{3}} n_3^{\frac{2}{3}},$$
$$n_1 d1 = n_2 d2 = \lambda/6,$$

where $\lambda$ is a wavelength of light.

9. The 3D display according to claim 8, wherein the spacer is spherical.

10. The 3D display according to claim 8, wherein the index of refraction $n_2$ of the first antireflection film is larger than the index of refraction $n_1$ of the second antireflection film.

* * * * *